Aug. 26, 1958   P. P. RUPPE ET AL   2,849,140
CONVEYOR ELEVATOR
Original Filed Feb. 25, 1952   2 Sheets-Sheet 1
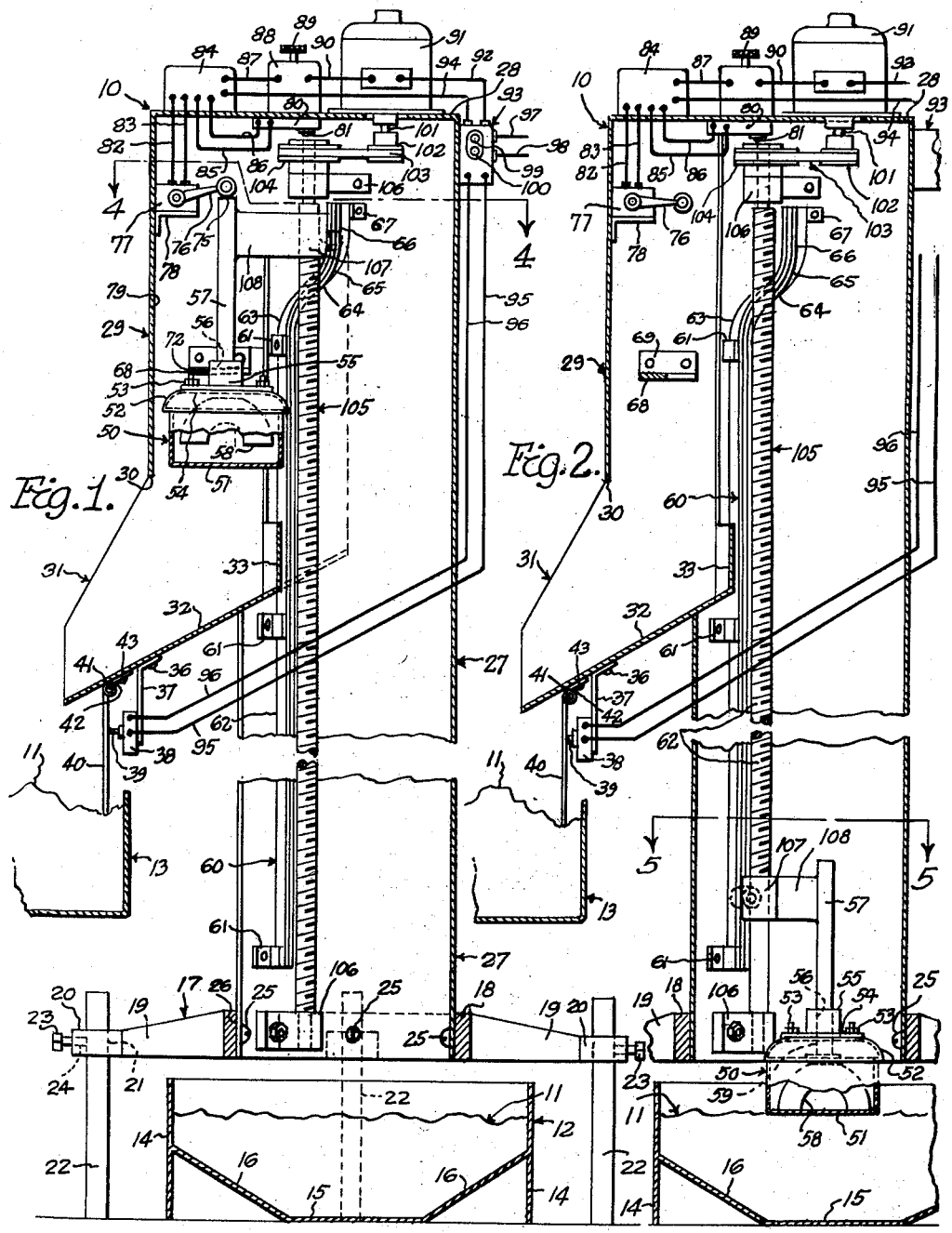
INVENTOR.
Peter P. Ruppe
BY Alan E. Bodycombe
Barthel & Bugbee
Attys INVENTOR.
Peter P. Ruppe
BY Alan E. Bodycombe
Barthel + Bugbee
Attys United States Patent Office 2,849,140
Patented Aug. 26, 1958

2,849,140

CONVEYOR ELEVATOR

Peter P. Ruppe and Alan E. Bodycombe,
Grosse Pointe Woods, Mich.

Original application February 25, 1952, Serial No. 273,290, now Patent No. 2,762,519, dated September 11, 1956. Divided and this application September 10, 1956, Serial No. 614,042

2 Claims. (Cl. 214—730)

This application is a division of application, Serial No. 273,290, filed February 25, 1952, which issued as Patent No. 2,762,519, on September 11, 1956.

This invention relates to conveyor elevators and, in particular, to a conveyor elevator for lifting small articles from a supply station at a lower level to a delivery station at a higher level, and discharging them at the high level.

One object of this invention is to provide a conveyor elevator which automatically picks up small articles from a supply station such as a tote box or other supply receptacle and carries them upward to a delivery station at a higher level where it discharges them into a discharge recptacle such as a chute, repeating the operation regularly until the tote box has been emptied.

Another object is to provide a conveyor elevator of the foregoing character in which the articles are wholly or partly of ferrous metal and the elevator has a magnet for picking up and carrying the articles.

Another object is to provide a conveyor elevator wherein the article carrier picks up the conveys measured quantities of the articles.

Another object is to provide a conveyor elevator of the foregoing character which is provided with variable compensating mechanism which automatically makes an allowance for the changing level in the tote box or supply receptacle, so that the article carrier always halts at the level of the articles in the supply receptacle and automatically reverses its motion, regardless of the changing level of the articles therein.

Another object is to provide a conveyor elevator of the foregoing character wherein an article pickup is elevated by various means, such as mechanically by a screw.

Another object is to provide a conveyor elevator of the foregoing character wherein the article pickup at a predetermined location during its path of ascent is automatically moved laterally to a discharge station at a higher level but offset laterally from the supply station, and returned laterally to its original path at a predetermined location during its path of descent.

Another object is to provide a conveyor elevator wherein the elevated articles, after discharge, are received into a receptacle which is provided with a device which automatically halts the conveyor elevator at a predetermined level of the articles, thereby preventing overflow of the articles in the receiving receptacle.

Another object is to provide a conveyor elevator of the foregoing character which is arranged substantially vertically so as to occupy the minimum floor space and to operate with the minimum interference with adjacent activities.

Another object is to provide a conveyor elevator in which the speed of delivery of the conveyor elevator may be varied to suit individual conditions.

Other objects and advantages of the invention will become apparent during the course of the following description of the accompanying drawings, wherein:

Figure 1 is a central vertical section through a conveyor elevator in its discharging position, according to one form of the invention, employing an elevating screw, with the magnetic article pickup in its raised or discharging position and partly broken away to show the magnet in its raised position within the article carrier and with the central portion of the apparatus omitted to reduce the height of the drawing;

Figure 2 is a central vertical section through the conveyor elevator of Figure 1, but showing the article pickup in its lowered or loading position and partly broken away to show the magnet in its lowered position within the article pickup;

Hitherto, in industrial establishments, the conveying of small parts or articles from a lower loading level to a higher discharge level has presented a difficult problem, particularly as regards the conveying of such articles in measured quantities. Another difficulty has been the problem of adjusting the rate of delivery of the conveyor to the varying demands of the machine or other article-consuming station so that the conveyor will deliver neither too few nor too many articles at a given time. Still another problem has been the difficulty of adapting the loading point of the conveyor to a varying level of the articles to be conveyed, or to a varying level of the articles discharged.

The present invention solves all of these problems by providing a conveyor elevator wherein the articles are picked up automatically by an article pickup which is provided with compensating mechanism permitting it to rise and fall in response to the rise and fall of the level of the articles in the supply receptacle at the loading station, to reverse itself automatically, to halt automatically at its elevated position and discharge the articles, and again to reverse automatically and travel downward to its loading position, repeating these operatons indefinitely until halted by the operator or automatically by an excessive accumulation of articles at the discharge station. The article pickup for picking up ferrous metal articles is provided with a pickup magnet, and is automatically swung laterally to its discharge position when it reaches a predetermined location during its upward path of travel, and returned laterally to its original path at a predetermined position in its descent, the conveyor elevator being reversed automatically at the lower and upper positions of its travel so that it repeats its conveying and elevating operation repeatedly an indefinite number of times.

Screw-operated conveyor elevator

Figure 3:
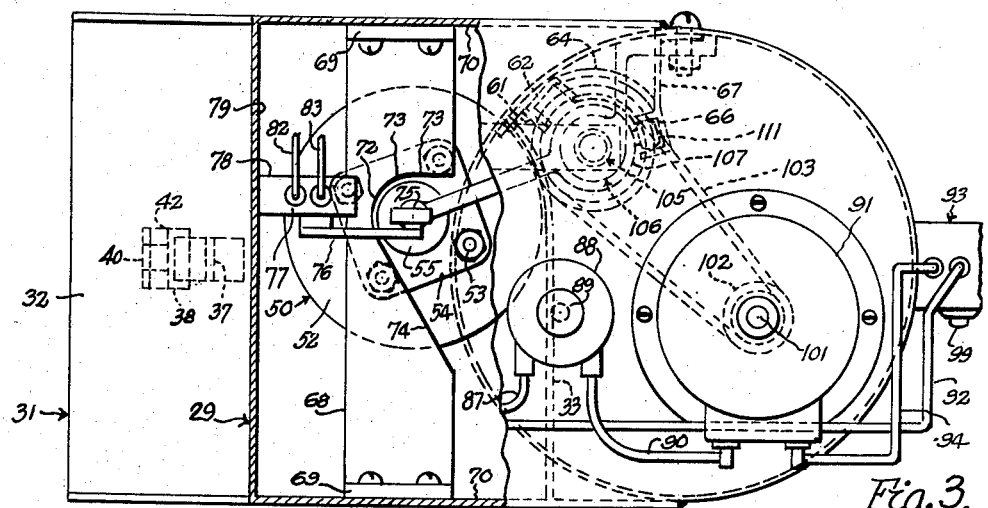
Figure 3 is an enlarged top plan view of the conveyor elevator of Figures 1 and 2, partly broken away to show the stop and limit switch mechanism.
Figure 4:
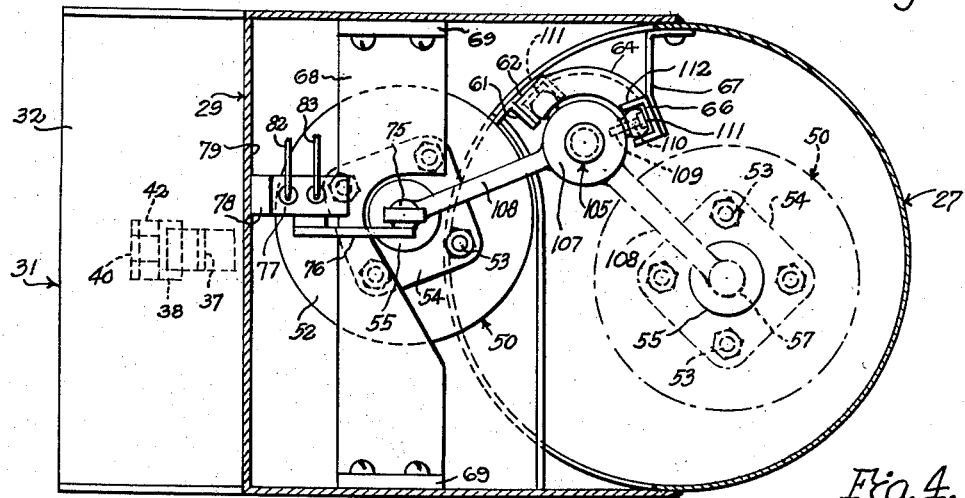
Figure 4 is a horizontal section taken along the line 4—4 in Figure 1 showing the channel cam for guiding and swinging the article pickup from its dotted line loading position to its solid line discharging position.
Figure 5:
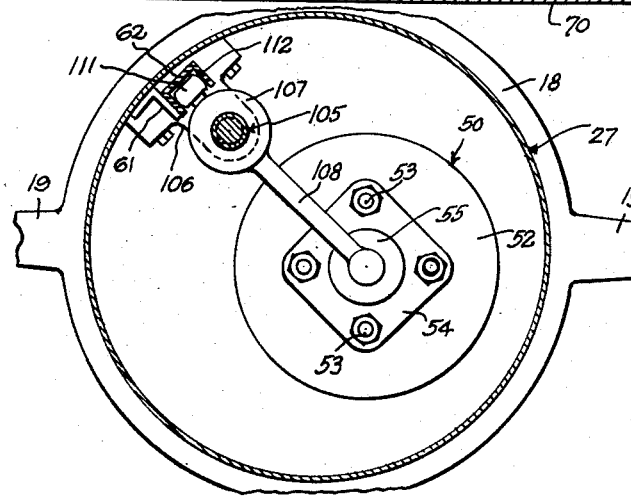
Figure 5 is a horizontal section taken along the line 5—5 in Figure 2, showing the channel cam and article pickup in the loading position.

Referring to the drawings in detail, Figures 1 to 5 inclusive show a conveyor elevator, generally designated 10, according to one form of the invention as arranged to pick up and elevate articles 11 of ferrous metal from a supply container or receptacle, generally designated 12, to a receiving or delivery container or receptacle, generally designated 13, located at a higher level. This supply container or receptacle 12 may be a tote box, as shown, or it may consist of a supply conveyor, such as a belt conveyor, or any other means by which the articles to be conveyed are brought into proximity to the conveyor elevator 10. As shown, the supply container or receptacle 12 is in the form of a tote box with sides 14 and a flat bottom 15 with sloping walls 16 extending from the sides 14 to the bottom 15 so as to cause the articles to slide downward toward the bottom 15.

The conveyor elevator 10 is provided with a base structure generally designated 17 having an annular central portion 18 with arms 19 radiating outwardly therefrom to bosses 20 which are bored vertically as at 21 to slidably receive legs 22 held in position by set screws 23 threaded through holes 24 transversely to the bores 21. Secured as at 25 within the central bore 26 of the annular portion 18 is a tubular housing 27 which extends upward to the top of the machine and is there closed by a cover or top wall 28. The housing 27 has a laterally offset extension 29 with an opening 30 which receives a discharge spout 31 having a downwardly and outwardly inclined bottom wall 32, and a rear wall 33 located within the confines of the housing 27.

Secured as at 36 to the bottom wall 32 of the discharge spout 31 is a downwardly-extending bracket 37 carrying a conventional normally-closed discharge control switch 38 having an operating plunger 39 which is moved to open-circuit position by a laterally-swinging switch-operating arm 40 pivoted as at 41 to a bracket 42 secured as at 43 to the underside of the bottom wall 32 of the discharge spout 31. As discussed below in connection with the operation of the invention, the switch-operating arm 40 is swung to the right as the articles discharged from the spout 31 accumulate in a mound in the receiving container 13 and roll down the slope thereof against the switch-operating arm 40, swinging the latter into operating engagement with the switch-operating plunger 39 to open the switch 38 and halt the conveyor operation.

For purposes of illustration, the articles 11 are assumed to be of ferrous metal such as iron or steel, or of iron alloys and therefore magnetically attracted. For the purpose of picking up and carrying such ferrous metal articles, the conveyor elevator 10 is provided with a magnetic article pickup, generally designated 50, which includes a cup-shaped non-magnetic casing 51 secured to a cover 52 which in turn is bolted or otherwise secured as at 53 to a plate or disc 54 having a central hub or boss 55 provided with a bore 56 which loosely and slidably receives a rod or shaft 57 carrying a permanent magnet 58 on its lower end 59.

In the present invention the article pickup 50 is guided in its upward travel or ascent and also swung laterally at the top of its travel by a channel cam, generally designated 60, and attached by angle brackets 61 to the inner surface of the housing 27 at intervals during its extent. The channel cam 60 is provided for the greater part of its height with a straight or rectilinear portion 62 at the top 63 of which it continues in a curved or helical portion 64 and at a higher turning point 65 continues again upward in a straight or rectilinear portion 66. The curved or helical portion 64 (Figure 4) is of sufficient extent circumferentially to swing the article carrier 50 laterally to the desired extent, the extent shown for purposes of illustration in Figures 1 to 5 inclusive being approximately a third of a revolution. The top portion 66 is secured to the housing 27 by an elongated angle bracket 67.

In order to limit the vertical travel of the article pickup 50 and its rod 57, a stop bar 68 is bolted or otherwise secured at its opposite ends 69 (Figures 3 and 4) to the inside of the side walls 70 of the housing extension 29. The stop bar 68 is provided with a cutaway portion or notch 71 having an approximately quarter-circular or arcuate central portion 72 (Figures 3 and 4) approached by straight end portions 73 and 74 tangential thereto and arranged at an acute angle to one another. The quarter-circular portion 72 is of a radius of curvature slightly greater than the radius of curvature of the hub or boss 55 so as to provide clearance of the latter during its ascent, until one of the bolts 53 engages the underside of the stop bar 68 and halts the ascent of the article carrier 50, as described in connection with the operation of the invention. When this occurs, the upper end 75 of the rod 57 engages and pushes upward the operating arm 76 of an upper motor-reversing switch 77 mounted on an angle bracket 78 secured to the inside of the front wall 79 of the casing extension 29.

Mounted on the underside of the cover or top wall 28 is a lower reversing switch 80 having a downwardly-extending plunger 81. The upper reversing switch 77 is connected by wires 82 and 83 to a motor control switch 84 which it actuates, whereas the lower reversing switch 80 is similarly connected by wires 85 and 86 thereto for reversing the downward travel of the article pickup 50 at the lowermost part of its stroke, as set forth in connection with the operation of the invention. The switches 77, 80 and 84 are conventional and well-known and their details form no part of the invention.

Also mounted on the cover or top wall 28 and connected to the motor control switch 84 by the wire 87 is a conventional motor speed controller 88 regulated by a hand wheel 89 and connected by the wire 90 to a vertical electric motor 91 which in turn is connected by a wire 92 to the starting and stopping switch box 93 or push button switch station, which is also directly connected to the motor control switch 84 by the wire 94. The starting and stopping switch 93 is also connected by wires 95 and 96 to the discharge control switch 38, and is supplied with electric current from the wires 97 and 98 connected to an external source of current. The motor speed controller 88 and the starting and stopping switch 93 are likewise conventional and their details likewise form no part of the present invention. The starting and stopping switch 93 is provided with the usual starting and stopping push buttons 99 and 100 respectively by which the motor 91 is started and stopped manually through the action of the electric current just described.

The motor 91 is provided with a drive shaft 101 extending downwardly through the cover or top wall 38 of the housing 27 and on its lower end carries a drive pulley 102 connected by a belt or other power-transmission element 103 to a driven pulley 104 mounted upon the upper end of a screw shaft 105. The upper and lower ends of the screw shaft 105 are unthreaded and are supported not only for rotation by a pair of bearing brackets 106 located respectively near the upper and lower ends of the screw shaft 105, but also for a slight amount of vertical or axial reciprocation in order to operate the lower reversing switch 80 by engaging the switch plunger 81 thereof, as explained below in connection with the operation of the invention. The screw shaft 105 is threaded throughout the major portion of its length, and upon it is mounted the threaded nut or hub 107 on the inner end of an arm 108 connected at its outer end to the rod 57 which supports the article pickup 50 on its lower end. The hub or nut 107 is provided with a socket 109 (Figure 4) in which is seated a pivot pin or stud 110 carrying a roller 111 which travels in the groove or channel 112 of the channel cam 60.

In the operation of the screw-operated conveyor elevator 10 shown in Figures 1 to 5 inclusive, the supply container 12 is provided with ferrous metal articles 11 which it is desired to elevate and convey to the receiving container 13, for example, internal combustion engine valves which are to be ground in a grinding machine. The filled supply container 12 is then inserted beneath the lower end of the housing 27 or, if it consists of a moving conveyor, the latter is trained to pass beneath the lower end of the housing 27 so as to carry the conveyed articles past the latter. The operator then presses the starting button 99, starting the shaft 101 of the motor 91 in rotation and consequently rotating the screw shaft 105 in a forward direction, causing the hub or nut 107 to be carried downward, taking with it the article pickup 50. As the threaded hub 107 travels downward, the roller 111 follows the curving channel or groove 112 of the helical portion 64 of the channel cam 60, swinging the arm 108, the rod 57 and the article carrier 50 through a partial revolution into the dotted line position of Figure 4 substantially in the center of the housing 27 whereupon the roller 111 encounters the straight portion 62 of the channel cam 60 and thereafter descends in a straight path.

When the article pickup 50 has thus been lowered until its non-magnetic casing 51 engages the articles 11, the casing 51 halts, but the rod 57 and the pickup magnet 58 carried by it continue to be carried downward by the nut 107 and arm 108 until the magnet 58 comes to rest against the bottom of the casing 51 and can move no further. Since thread 57, arm 108 and nut or threaded hub 107 can move no farther downward, the continued rotation of the screw shaft 105 causes the screw shaft itself to move upward in its bearing brackets 106, causing the upper end of the screw shaft 105 to engage the switch plunger 81 and operate the reversing switch 80 to reverse the direction of rotation of the motor 91. Meanwhile, the descent of the magnet 58 to a position against the bottom of the casing 51 causes its magnetic field to be brought into close proximity to the ferrous metal articles 11 to be conveyed, causing them to adhere to the casing 51.

The reverse rotation of the screw shaft 105 brought about by the reversal of the driving motor 91 to the operation of the lower reversing switch 80 by the rising of the screw shaft 105 in its bearing brackets 106, causes the threaded hub or nut 107, arm 108 and rod 57 to travel upward from the position shown in Figure 2, to that shown in Figure 1, carrying with them the magnet 58, casing 51 and a specific number of the ferrous metal articles 11 determined by the magnetic force exerted by the magnet 58 and the weight of each article 11. Articles in excess of this specific number will drop off as the article pickup 50 rises, due to the inability of the magnet 58 to lift a load beyond its capacity.

As the article pickup 50 moves upward out of contact with the articles 11 remaining in the supply receptacle 12, the rod 57, arm 108 and threaded hub or nut 107 cease to support the screw shaft 105 in its raised position, whereupon it drops downward slightly until its upper end moves out of engagement with the operating plunger 81 of the lower reversing switch 80. The screw shaft 105, however, continues to rotate in a reverse direction, and the roller 111 travels upward in the channel 112 of the channel cam 60, swinging the arm 108 from the dotted line position (Figure 4) to the solid line position when the roller 111 reaches and traverses the helical portion 64 of the channel cam 60. Thus swung, the arm 108 and its associated parts, including the article pickup 50 and rod 57, continue to move upward in a straight path as the roller 111 traverses the upper straight portion 66 of the channel cam 62.

When the screws 53 encounter the stop bar 68 (Figures 1, 3 and 4), they halt the non-magnetic pickup casing 51 to which they are attached. The rod 57 and the magnet 58 attached to it, however, continue to be moved upward by the upwardly travelling arm 108 and threaded hub 107, pulling the pickup magnet 58 away from the bottom of the pickup casing 51 and accordingly decreasing the strength of the magnetic field at the bottom of the casing 51 in accordance with the well-known inverse square law of magnetic force. This reduction in the magnetic force causes the conveyed articles to drop off the casing 51 of the article pickup 50 and to fall downward through the spout 31 into the receiving container 13 where they accumulate in a heap. Meanwhile, the rod 57 is moved upward until its upper end 75 shifts the operating arm 76 of the upper reversing switch 77, reversing the direction of rotation of the motor 91 and screw shaft 105 and consequently causing the threaded hub or nut 107, arm 108, rod 57 and article pickup 50 again to descend, repeating the foregoing operation automatically until halted by the operator or by the discharge control switch 38.

The discharge control switch 38 is operated when the conveyed articles 11 accumulate to such a height in the receiving container 13 that they tumbled downward along the sides of the heap until they push against the swinging arm 40 to actuate the plunger 39 of the discharge control switch 38, independently operating the starting and stopping switch 93 to halt the motor 91. This arrangement prevents the undesired accumulation of an excessive number or quantity of conveyed parts in the receiving container 13. When, however, the level of the parts 11 in the receiving container 13 drops below the lower end of the arm 40, it swings to the left, releasing the switch plunger 39 and permitting the motor 19 to restart and continue the operation of the conveyor elevator 10 in the manner previously described. In place of the reversible motor 91, it will be obvious that a conventional reversing gearbox or other reversing mechanism and a non-reversible motor may be substituted.

What we claim is:

1. A conveyor elevator for lifting articles from a supply station at a low level to a laterally offset delivery station at a higher level, said conveyor elevator comprising a substantially upright supporting structure positioned above said supply station, an article pickup elevator unit connected to said supporting structure and movable in a substantially vertical path, an article pickup carrier unit connected to said elevator unit and movable upward and downward thereby, said carrier unit being mounted on said elevator unit for lateral movement relatively thereto, an article pickup carrier unit connected to said elevator unit and movable upward and downward thereby, said carrier unit being mounted on said elevator unit for lateral movement relatively thereto, an article pickup unit mounted on said carrier unit for travel therewith, a motor drivingly connected to said elevator unit, and mechanism responsive to the travel of one of said units to a predetermined height above said supply station for moving said carrier unit laterally relatively to said elevator unit toward said delivery station, said elevator unit including a screw element and said carrier unit including a nut element threadedly engaging said screw element and traveling therealong, one of said elements being rotatable relatively to the other element and drivingly connected to said motor.

2. A conveyor elevator for lifting articles from a supply station at a low level to a laterally offset delivery station at a higher level, said conveyor elevator comprising a substantially upright supporting structure positioned above said supply station, an article pickup elevator unit connected to said supporting structure and movable in a substantially vertical path, an article pickup carrier unit connected to said elevator unit and movable upward and downward thereby, said carrier unit being mounted on said elevator unit for lateral movement relatively thereto, and article pickup carrier unit connected to said elevator unit and movable upward and downward thereby, said carrier unit being mounted on said elevator unit for lateral movement relatively thereto, an article pickup unit mounted on said carrier unit for travel therewith, a motor drivingly connected to said elevator unit, mechanism responsive to the travel of one of said units to a predetermined height above said supply station for moving said carrier unit laterally relatively to said elevator unit toward said delivery station, said elevator unit including a screw element and said carrier unit including a nut element threadedly engaging said screw element and traveling therealong, one of said elements being rotatable relatively to the other element and drivingly connected to said motor, said screw element being mounted for bodily longitudinal movement, and reversing apparatus responsive to the engagement of said pickup unit with articles at said supply station for shifting said screw element longitudinally upward and reversing the travel of said elevator unit from a downward to an upward direction.

No references cited.